US009612520B2

(12) United States Patent
Huang

(10) Patent No.: US 9,612,520 B2
(45) Date of Patent: Apr. 4, 2017

(54) POLARIZED PROJECTION DEVICE AND POLARIZED PROJECTION SYSTEM USING THE SAME

(71) Applicant: DELTA ELECTRONICS, INC., Taoyuan (TW)

(72) Inventor: June-Jei Huang, Taoyuan (TW)

(73) Assignee: DELTA ELECTRONICS, INC. (TW)

( * ) Notice: Subject to any disclaimer, the term of this patent is extended or adjusted under 35 U.S.C. 154(b) by 78 days.

(21) Appl. No.: 14/665,383

(22) Filed: Mar. 23, 2015

(65) Prior Publication Data

US 2016/0195802 A1 Jul. 7, 2016

(30) Foreign Application Priority Data

Jan. 6, 2015 (TW) .............................. 104100139 A

(51) Int. Cl.
| | |
|---|---|
| *G03B 21/28* | (2006.01) |
| *G03B 35/26* | (2006.01) |
| *G03B 21/00* | (2006.01) |
| *G02B 5/30* | (2006.01) |
| *G03B 21/20* | (2006.01) |

(52) U.S. Cl.
CPC ........... *G03B 35/26* (2013.01); *G02B 5/3016* (2013.01); *G02B 5/3083* (2013.01); *G03B 21/005* (2013.01); *G03B 21/006* (2013.01); *G03B 21/2066* (2013.01); *G03B 21/2073* (2013.01); *G03B 21/28* (2013.01)

(58) Field of Classification Search
CPC ................ G03B 21/28; G03B 21/2066; G03B 21/2073; G02B 27/26; G02B 27/149; G02B 27/283; G02B 27/1026
See application file for complete search history.

(56) References Cited

U.S. PATENT DOCUMENTS

| | | | |
|---|---|---|---|
| 5,963,372 A | * | 10/1999 | Barak .................. G02B 27/283 349/194 |
| 7,905,602 B2 | | 3/2011 | Schuck et al. |
| 7,959,296 B2 | | 6/2011 | Cowan et al. |
| 8,721,083 B2 | | 5/2014 | Huang |

(Continued)

FOREIGN PATENT DOCUMENTS

| | | |
|---|---|---|
| CN | 101930126 | 12/2010 |
| TW | 201224434 | 6/2012 |
| TW | I435117 | 4/2014 |

*Primary Examiner* — Sultan Chowdhury
(74) *Attorney, Agent, or Firm* — Hauptman Ham, LLP

(57) ABSTRACT

A polarized projection device includes a light source, a light modulator, and a lens module. The light source is configured for providing a light beam. The light modulator is configured for modulating the light beam into an image. The lens module is configured for converting the image into a polarized image, and includes a polarized prism group, a first polarized module, a second polarized module, a lens, and a half wave plate. The polarized prism group has an incident surface, a light-emitting surface, a first relay surface, and a second relay surface. The image enters the polarized prism group from the incident surface. The first (second) polarized module is disposed off axis at the first (second) relay surface and includes a first (second) reflector and a first (second) quarter wave plate. The lens is disposed at the light-emitting surface. The half wave plate is partially disposed on the lens.

10 Claims, 4 Drawing Sheets

(56) References Cited

U.S. PATENT DOCUMENTS

| | | | |
|---|---|---|---|
| 2002/0154273 A1 | 10/2002 | Seo et al. | |
| 2006/0238715 A1* | 10/2006 | Hirata | G02B 5/3058 353/20 |
| 2008/0088815 A1 | 4/2008 | Nomura | |
| 2011/0242490 A1* | 10/2011 | Itoh | G02B 27/1026 353/8 |
| 2012/0057134 A1 | 3/2012 | Huang | |
| 2012/0127435 A1* | 5/2012 | Kitano | G03B 21/204 353/20 |
| 2013/0286357 A1* | 10/2013 | Kodama | G03B 33/12 353/20 |
| 2014/0049698 A1* | 2/2014 | Hirata | G03B 21/006 349/9 |
| 2014/0253849 A1* | 9/2014 | Poon | G02B 27/102 349/97 |

* cited by examiner

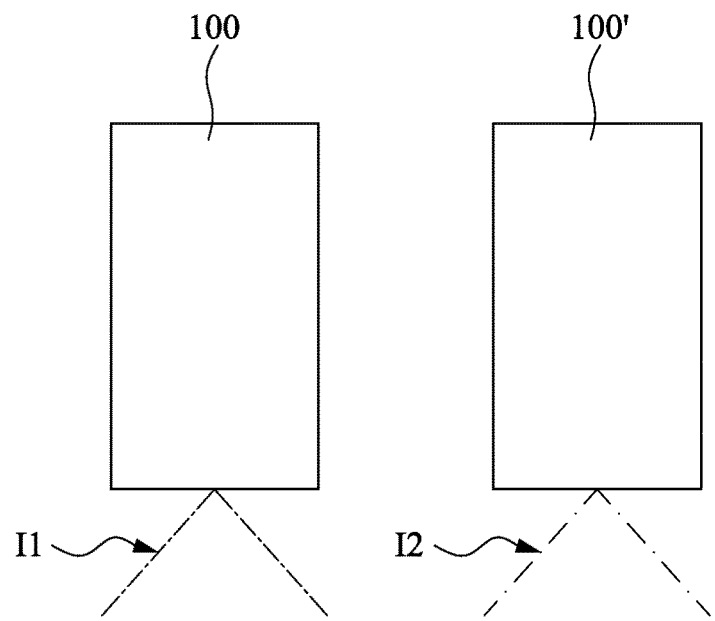
Fig. 4
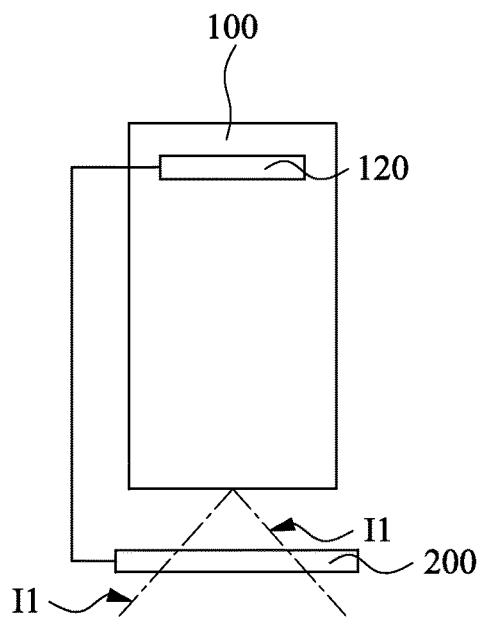 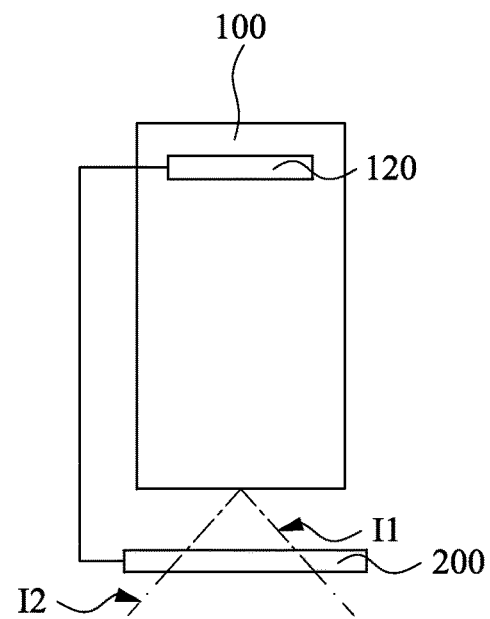
Fig. 5A              Fig. 5B

POLARIZED PROJECTION DEVICE AND POLARIZED PROJECTION SYSTEM USING THE SAME

RELATED APPLICATIONS

This application claims priority to Taiwan Application Serial Number 104100139, filed Jan. 6, 2015, which is herein incorporated by reference.

BACKGROUND

Field of Invention

The present invention relates to a polarized projection device.

Description of Related Art

In recent years, three-dimensional (3D) display technology experiences technical breakthrough, and gradually commercialized into products like 3D movies and 3D televisions. The 3D effect of a 3D display actually comes from simultaneously presenting to an observer's two eyes a left-eye image and a right-eye image corresponding to different viewing angles. As such, an effect with depth of field is simulated from a distance between the two eyes when viewing the 3D display by using the left-eye image and the right-eye image.

The left- and right-eye images need to be respectively and individually projected to the corresponding eyes of the observer. The right-eye of the observer cannot see the left-eye image, and vise versa. This display method, which generally includes dichroic filtering method and polarization filtering method, normally depends on wearing optical filtering glasses by the observer. As far as the conventional polarization filtering method is concerned, an unpolarized light is differently polarized in time sequence through a filter, but such filtering costs half of its original intensity. Therefore, one of the urgent problems to solve in the industry is how to reduce the light intensity lost.

SUMMARY

An aspect of the present invention is to provide a polarized projection device including a light source, a light modulator, and a lens module. The light source is configured for providing a light beam. The light modulator is configured for modulating the light beam into an image. The lens module is configured for converting the image into a polarized image, and includes a polarized prism group, a first polarized module, a second polarized module, a lens, and a half wave plate. The polarized prism group has an incident surface, a light-emitting surface, a first relay surface, and a second relay surface. The image enters the polarized prism group from the incident surface. The first polarized module is disposed off axis at the first relay surface and includes a first reflector and a first quarter wave plate disposed between the first reflector and the polarized prism group. The second polarized module is disposed off axis at the second relay surface and includes a second reflector and a second quarter wave plate disposed between the second reflector and the polarized prism group. The lens is disposed at the light-emitting surface. The half wave plate is partially disposed on the lens.

In one or more embodiments, a first light path is formed between the first polarized module and the lens, and a second light path is formed between the second polarized module and the lens. The half wave plate is disposed at the first light path and is separated from the second light path.

In one or more embodiments, the image in the polarized prism group has an aperture, the first polarized module is off-axis at a distance about ¼ times of the aperture.

In one or more embodiments, the first polarized module further includes a first relay lens group disposed off axis between the first quarter wave plate and the polarized prism group.

In one or more embodiments, the lens module further includes an entrance lens module disposed between the light modulator and the polarized prism group.

In one or more embodiments, the polarized projection device further includes an optical module for guiding the light beam provided by the light source to the light modulator, and guiding the image to the lens module.

In one or more embodiments, the optical module includes a totally internal reflection prism group.

Another aspect of the present invention is to provide a polarized projection system including a plurality of the polarized projection devices. Two of the polarized images of the polarized projection devices have different polarizations.

Still another aspect of the present invention is to provide a polarized projection system including the polarized projection device and a polarization converting element disposed on the lens of the polarized projection device.

In one or more embodiments, the polarization converting element is a liquid crystal panel.

BRIEF DESCRIPTION OF THE DRAWINGS

FIG. 4 is a schematic diagram of a polarized projection system according to one embodiment of the present invention; and FIGS. 5A and 5B are schematic diagrams of a polarized projection system in different time periods according to another embodiment of the present invention.

DETAILED DESCRIPTION

Figure 1:
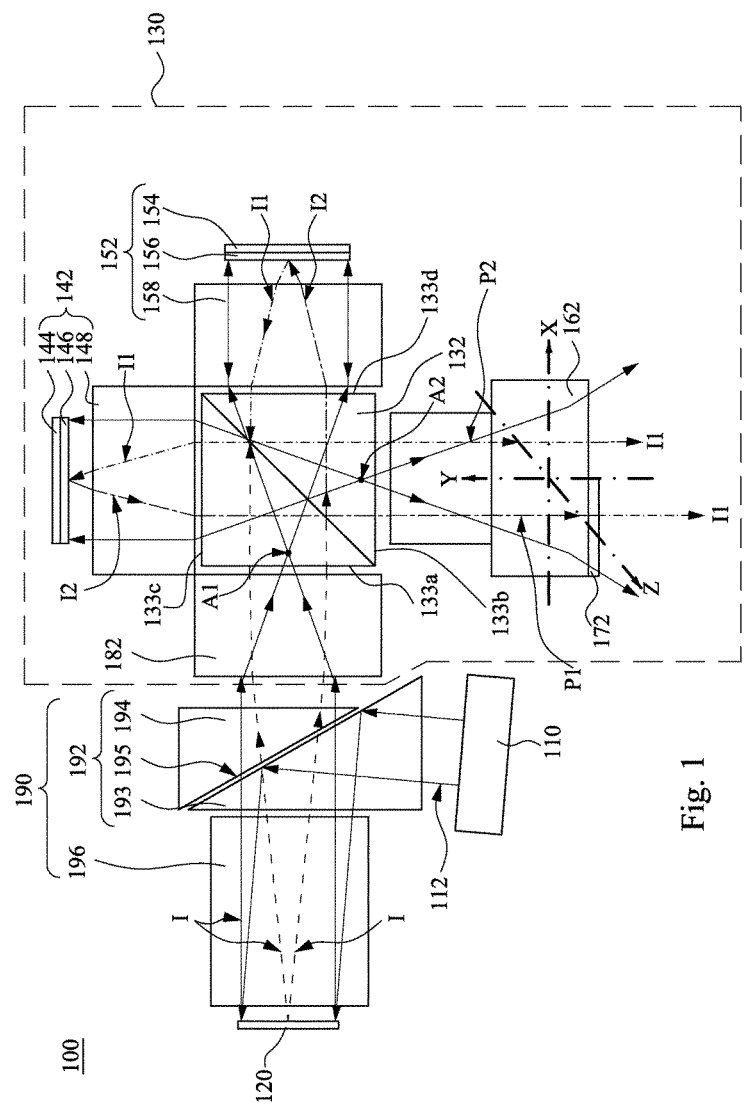
FIG. 1 is schematic diagram of a polarized projection device according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
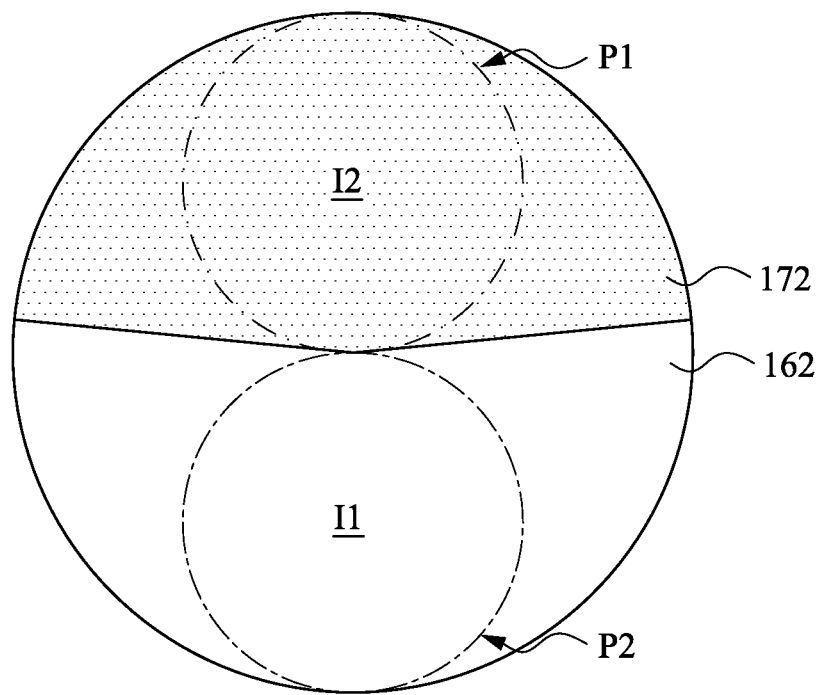
FIG. 2 is a front view of a lens and a half wave plate in FIG. 1.

FIG. 1 is schematic diagram of a polarized projection device 100 according to one embodiment of the present invention, and FIG. 2 is a front view of a lens 162 and a half wave plate 172 in FIG. 1. The solid lines in FIG. 1 indicates the traveling paths of edges of whole light beam 112, image I, and polarized images I1, I2, and dashed lines indicates the traveling paths of single pixel in the image I and the polarized images I1, I2. Reference is made to FIGS. 1 and 2. As shown in figures, the polarized projection device 100 includes a light source 110, a light modulator 120, and a lens module 130. The light source 110 is configured for providing a light beam 112. The light modulator 120 is configured for modulating the light beam 112 into an image I. The lens module 130 is configured for converting the image I into a polarized image I1. The lens module 130 includes a polarized prism group 132, a first polarized module 142, a second polarized module 152, a lens 162, and a half wave plate 172. The polarized prism group 132 has an incident surface 133a, a light-emitting surface 133b, a first relay surface 133c, and a second relay surface 133d. The image I enters the polarized prism group 132 from the incident surface 133a. The first polarized module 142 is disposed off axis at the first relay surface 133c and includes a first reflector 144 and a first quarter wave plate 146 disposed between the first reflector 144 and the polarized prism group 132. The second polarized module 152 is disposed off axis at the second relay surface 133d and includes a second reflector 154 and a second quarter wave plate 156 disposed between the second reflector 154 and the polarized prism group 132. The lens 162 is disposed at the light-emitting surface 133b. The half wave plate 172 is partially disposed on the lens 162, as shown in FIG. 2.

Furthermore, a first light path P1 is formed between the first polarized module 142 and the lens 162, and a second light path P2 is formed between the second polarized module 152 and the lens 162. The first path P1 is separated from the second path P2 since the first polarized module 142 is disposed off axis at the first relay surface 133c and the second polarized module 152 is disposed off axis at the second relay surface 133d, as shown in FIG. 2. In this embodiment, the half wave plate 172 is disposed at the first light path P1 and is separated from the second light path P2. However, in other embodiments, the half wave plate 172 can be disposed at the second light path P2 and is separated from the first light path P1. Moreover, the shape of the half wave plate 172 in FIG. 2 is illustrative only and should not limit the claimed scope of the present invention. Basically, an embodiment falls within the claimed scope if the half wave plate 172 covers one of the first light path P1 and the second light path P2 and exposes the other.

The light beam 112 provided by the light source 110 is non-polarized light, which is combined by a first polarized light and a second polarized light orthogonal to each other. The light beam 112 is incident the light modulator 120, and is modulated into the image I by the light modulator 120. The image I then enters the lens module 130 and is incident the polarized prism group 132. The polarized prism group 132 can, for example, reflect the polarized image I1 with the first polarization, and allow the polarized image I2 with the second polarization to pass therethrough. Therefore, the polarized image I1 with the first polarization is reflected to the first relay surface 133c, and the polarized image I2 with the second polarization reaches the second relay surface 133d. The polarized image I1 thus enters the first polarized module 142. After reaching the first reflector 144 and the first quarter wave plate 146, the polarized image I1 is reflected back to the first relay surface 133c by the first reflector 144. Furthermore, since the polarized image I1 passes through the first quarter wave plate 146 twice, the polarized image I1 with the first polarization is converted into the polarized image I2 with the second polarization. In addition, since the first polarized module 142 is disposed off axis at the first relay surface 133c, the polarized image I2 propagating back to the first relay surface 133c shifts a distance towards +Z direction. Subsequently, the polarized image I2 passes through the polarized lens module 132, the lens 162, and the half wave plate 172 in sequence and is converted into the polarized image I1 by the half wave plate 172. The converted polarized image I1 then leaves the polarized projection device 100.

On the other hand, the polarized image I2 enters the second polarized module 152. After reaching the second reflector 154 and the second quarter wave plate 156, the polarized image I2 is reflected back to the second relay surface 133d by the second reflector 154. Furthermore, since the polarized image I2 passes through the second quarter wave plate 156 twice, the polarized image I2 with the second polarization is converted into the polarized image I1 with the first polarization. In addition, since the second polarized module 152 is disposed off axis at the first relay surface 133d, the polarized image I1 propagating back to the second relay surface 133d shifts a distance towards −Z direction. Subsequently, the polarized image I1 passes through the polarized lens module 132 and the lens 162 and then leaves the polarized projection device 100.

Therefore, after passing through the lens module 130, the image I can be totally converted into the polarized image I1 without losing its intensity. Moreover, the polarized projection device 100 can generate polarized image I2 if the half wave plate 172 is disposed at the second light path P2 and is separated from the first light path P1.

In this embodiment, the lens module 130 further includes an entrance lens module 182 disposed between the light modulator 120 and the polarized prism group 132. Moreover, the first polarized module 142 further includes a first relay lens group 148 disposed off axis between the polarized prism group 132 and the first quarter wave plate 146. The second polarized module 152 further includes a second relay lens group 158 disposed off axis between the polarized prism group 132 and the second quarter wave plate 156. All of the entrance lens module 182, the first relay lens group 148, and the second relay lens group 158 can be composed by a plurality of lenses (not shown). The entrance lens module 182 is configured for focusing the image I, such that the image I form an aperture A1 near the incident surface 133a of the polarized prism group 132. The first relay lens group 148 and the second relay lens group 158 are configured for imaging the aperture A1 at a aperture A2 again, where the aperture A2 is located near the light emitting surface 133b. After leaving the light emitting surface 133b, the polarized images I1 and I2 pass through the lens 162 and are imaged onto a screen (not shown).

Figure 3B:
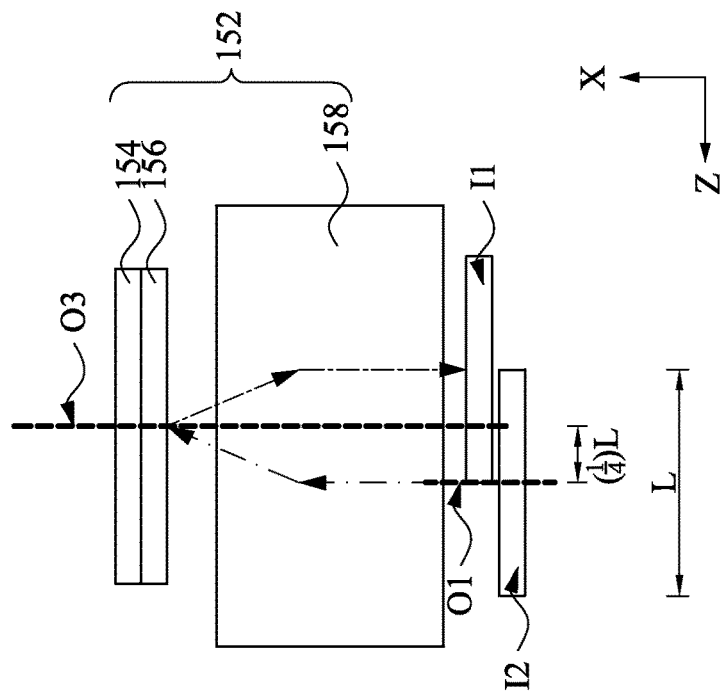
FIG. 3B is an optical schematic diagram of a polarized images of FIG. 1 passing through a second polarized module.
Figure 3A:
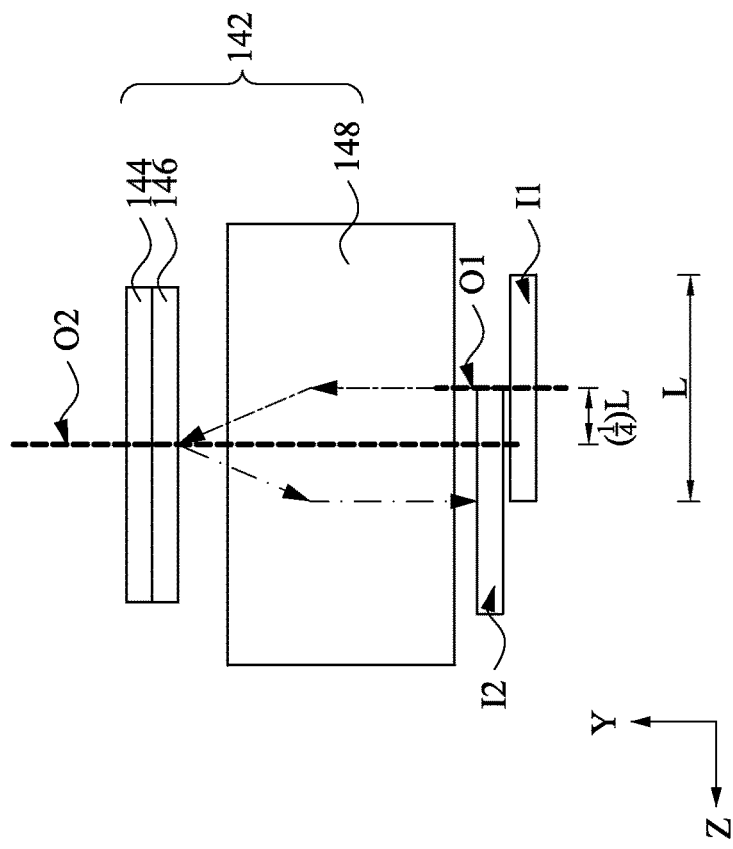
FIG. 3A is an optical schematic diagram of a polarized images of FIG. 1 passing through a first polarized module.

FIG. 3A is an optical schematic diagram of the polarized images I1, I2 of FIG. 1 passing through the first polarized module 142, and FIG. 3B is an optical schematic diagram of the polarized images I1, I2 of FIG. 1 passing through the second polarized module 152. Reference is made to FIGS. 3A and 3B. For achieving the displacements of the polarized images I1 and I2 mentioned above, both of the first polarized module 142 and the second polarized module 152 are disposed off axis from the optical axis O1 of the polarized images I1 and I2 (the polarized images I1 and I2 herein are the polarized image I1 impinging on the first polarized module 142 from the polarized prism group 132 of FIG. 1 and the polarized image I2 impinging on the second polarized module 152 from the polarized prism group 132). That is, both of optical axes O2 and O3 of the first relay lens group 148 and the second relay lens group 158 do not overlap the optical axis O1. Therefore, as shown in FIG. 3A, the position of the polarized image I2 is shifted relative to the polarized image I1 when it leaves the first relay lens group 148, and as shown in FIG. 3B, the position of the polarized image I1 is shifted relative to the polarized image I2, wherein the optical axes O2 and O3 are relatively shifted toward opposite sides of the optical axis O1. For example, the optical axis O2 of the first polarized module 142 can shift a distance of quarter length L of the aperture A1 (see FIG.

1) from the optical axis O1, and the optical axis O2 of the second polarized module 152 can shift a distance of quarter length L of the aperture A1 from the optical axis O1, and the claimed scope is not limited in this respect.

Reference is made to FIG. 1. In this embodiment, the polarized projection device 100 can further include an optical module 190 configured for guiding the light beam 112 provided by the light source 110 to the light module 120, and guiding the image I to the lens module 130. In some embodiments, the optical module 170 includes a total internal reflection (TIR) prism group 192. More specifically, the total internal reflection prism group 192 includes a first prism 193 and a second prism 194. A gap 195 is formed between the first prism 193 and the second prism 194. The optical module 190 can further include a prism 196 disposed between the first prism 193 and the light modulator 120. The light beam 112 enters the first prism 193, is reflected by the gap 195, passes through the prism 196, and then reaches the light modulator 120. Subsequently, the light modulator 120 modulates the light beam 112 into the image I, which is then reflected back to the prism 196. The image I then passes through the first prism 193, the gap 195, and the second prism 194 in sequence and is incident the lens module 130. Moreover, if the polarized projection device 100 provides colorful image, the prism 196 can be replaced with a Philips prism, and the light modulators 120 can be plural for respectively modulating light beams with different colors.

FIG. 4 is a schematic diagram of a polarized projection system according to one embodiment of the present invention. The polarized projection system includes a plurality of polarized projection devices 100, 100'. The polarized image I1 of the polarized projection device 100 has a first polarization such as the S-polarization, and the polarized image I2 of the polarized projection device 100' has a second polarization such as the P-polarization. For example, reference is made to FIGS. 2 and 4. In some embodiments, the half wave plate 172 of the polarized projection device 100 is disposed at the first light path P1 and is separated from the second light path P2. Hence, the polarized projection device 100 generates the polarized image I1. On the other hand, the half wave plate 172 of the polarized projection device 100' is disposed at the second light path P2 and is separated from the first light path P1. Hence, the polarized projection device 100' generates the polarized image I2. Therefore, the two polarized projection devices 100, 100' of the polarized projection system of the present embodiment can respectively provide two light paths with S- and P-polarized images, which are corresponding to left- and right-eye stereoscopic images, and the light intensities thereof are not reduced. Other relevant structural details of the polarized projection devices 100, 100' are all the same as the embodiment of FIG. 1, and, therefore, a description in this regard will not be repeated hereinafter.

FIGS. 5A and 5B are schematic diagrams of a polarized projection system in different time periods according to another embodiment of the present invention. The polarized projection system includes a polarized projection device 100 and a polarization converting element 200 disposed on the lens 162 (see FIG. 1) of the polarized projection device 100. When the polarization converting element 200 is at on state, a first (second) polarized image can be converted into a second (first) polarized image; when the polarization converting element 200 is at off state, the image passing therethrough maintains its polarization. The polarization converting element 200 may be a liquid crystal plate, whose on/off states depend on the supply of electric field thereof. Moreover, the switching timing of the polarization converting element 200 and the frame rate of the light modulator 120 are sync, such that the light modulator 120 can modulate the images I (see FIG. 1) corresponding to left and right eyes in different time periods.

Reference is made to FIG. 5A. In one time period, the light modulator 120 modulates an image I (see FIG. 1), such that the polarized projection device 100 generates a polarized image I1. At the same time, the polarization converting element 200 is turned off. Hence, the polarized image I1 passes through the polarization converting element 200 and maintains its polarization. Reference is made to FIG. 5B. In the next time period, the light modulator 120 modulates another image I, such that the polarized projection device 100 generates another polarized image I1. At the same time, the polarization converting element 200 is turned on, converting the polarized image I1 into a polarized image I2. Therefore, the polarized images I1 and I2 can be sequentially generated as long as the polarization converting element 200 are turned on/off in sequence and its frequency matches the frame rate of the light modulator 120. Other relevant structural details of the polarized projection devices 100 are all the same as the embodiment of FIG. 1, and, therefore, a description in this regard will not be repeated hereinafter.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A polarized projection device, comprising:
    a light source for providing a light beam;
    a light modulator for modulating the light beam into an image; and
    a lens module for converting the image into a polarized image, the lens module comprising:
        a polarized prism group having an incident surface, a light-emitting surface, a first relay surface, and a second relay surface, wherein the image enters the polarized prism group from the incident surface;
        a first polarized module disposed off axis at the first relay surface, the first polarized module comprising:
            a first reflector; and
            a first quarter wave plate disposed between the first reflector and the polarized prism group;
        a second polarized module disposed off axis at the second relay surface, the second polarized module comprising:
            a second reflector; and
            a second quarter wave plate disposed between the second reflector and the polarized prism group;
        a lens disposed at the light-emitting surface; and
        a half wave plate partially disposed on the lens.

2. The polarized projection device of claim 1, wherein a first light path is formed between the first polarized module and the lens, a second light path is formed between the second polarized module and the lens, and the half wave plate is disposed at the first light path and is separated from the second light path.

3. The polarized projection device of claim 1, wherein the image in the polarized prism group has an aperture, the first polarized module is off-axis at a distance about ¼ times of the aperture.

4. The polarized projection device of claim 1, wherein the first polarized module further comprises:
   a first relay lens group disposed off axis between the first quarter wave plate and the polarized prism group.

5. The polarized projection device of claim 1, wherein the lens module further comprises:
   an entrance lens module disposed between the light modulator and the polarized prism group.

6. The polarized projection device of claim 1, further comprising:
   an optical module for guiding the light beam provided by the light source to the light modulator, and guiding the image to the lens module.

7. The polarized projection device of claim 6, wherein the optical module comprises a totally internal reflection prism group.

8. A polarized projection system, comprising:
   a plurality of the polarized projection devices of claim 1, wherein two of the polarized images of the polarized projection devices have different polarizations.

9. A polarized projection system, comprising:
   the polarized projection device of claim 1; and
   a polarization converting element disposed on the lens of the polarized projection device.

10. The polarized projection system of claim 9, wherein the polarization converting element is a liquid crystal plate.

* * * * *